US012669155B2

(12) United States Patent
Carminati et al.

(10) Patent No.: US 12,669,155 B2
(45) Date of Patent: Jun. 30, 2026

(54) BRAKE PAD PIN AND AXIALLY CONSTRAINING ELASTIC ELEMENT ASSEMBLY AND INTERACTION METHOD

(71) Applicant: BREMBO S.p.A., Curno (IT)

(72) Inventors: Mattia Carminati, Curno (IT); Davide D'Alessio, Curno (IT)

(73) Assignee: Brembo S.p.A., Curno (IT)

( * ) Notice: Subject to any disclaimer, the term of this patent is extended or adjusted under 35 U.S.C. 154(b) by 463 days.

(21) Appl. No.: 18/252,622

(22) PCT Filed: Nov. 10, 2021

(86) PCT No.: PCT/IB2021/060381
§ 371 (c)(1),
(2) Date: May 11, 2023

(87) PCT Pub. No.: WO2022/101787
PCT Pub. Date: May 19, 2022

(65) Prior Publication Data
US 2023/0407932 A1     Dec. 21, 2023

(30) Foreign Application Priority Data
Nov. 13, 2020     (IT) ........................ 102020000027230

(51) Int. Cl.
*F16D 65/095*     (2006.01)
*F16D 55/00*     (2006.01)

(52) U.S. Cl.
CPC ...... *F16D 65/095* (2013.01); *F16D 2055/007* (2013.01)

(58) Field of Classification Search
CPC . F16D 65/095; F16D 2055/007; F16D 55/228
See application file for complete search history.

(56) References Cited

U.S. PATENT DOCUMENTS 4,084,665  A     4/1978  Burnett
4,279,331  A     7/1981  Hans-Henning
(Continued)

FOREIGN PATENT DOCUMENTS

EP          1425520  B1    12/2004

OTHER PUBLICATIONS

German Patent No. DE 102019124442 to Zenzen et al published on Mar. 11, 2021.*

(Continued)

*Primary Examiner* — Pamela Rodriguez
(74) *Attorney, Agent, or Firm* — Marshall & Melhorn, LLC

(57) ABSTRACT

A brake pad pin and axially constraining elastic element assembly has a supporting pin having a pin body that has a pin first portion having a pin first portion diameter and a pin second portion having a pin second portion diameter greater than the pin first portion diameter. An elastic element has an elastic element inner diameter and an elastic element outer diameter either greater than or equal to the pin second portion diameter. The elastic element inner diameter is smaller than the pin second portion diameter. A pin third portion has a pin third portion stretch having a pin third diameter greater than the elastic element inner diameter. The elastic element has an elastic element inner profile. The pin third portion has a pin third portion profile connecting the pin first and second portions and is biased towards the elastic element. The pin third portion profile is wedged into the elastic element inner profile.

18 Claims, 14 Drawing Sheets

(56)         References Cited

U.S. PATENT DOCUMENTS 4,678,210  A      7/1987  Balsells
2020/0300311  A1 *   9/2020  Minoshima ......... F16D 65/0977

OTHER PUBLICATIONS

WO document No. WO 2022/101772 to Huster et al published on May 19, 2022.*
European Patent Office, International Search Report, issued in PCT/IB2021/060381, Mar. 11, 2022, Rijswijk, NL.

* cited by examiner

BRAKE PAD PIN AND AXIALLY CONSTRAINING ELASTIC ELEMENT ASSEMBLY AND INTERACTION METHOD

FIELD OF THE INVENTION

The present invention relates to brake pad supporting pin and axially constraining elastic element assembly, as well as a brake caliper and an interaction method for a pad supporting pin and an axially constraining elastic element.

BACKGROUND ART

In a disc brake of known type, the brake caliper is generally arranged to straddle a brake disc mounted on the hub of a vehicle wheel. The brake caliper usually comprises a caliper body which accommodates the brake pads and actuators to push the pads against the disc to achieve the braking action on the vehicle.

In some known disc brake types, the pads are supported by supporting pins accommodated in specific caliper body housings made in the caliper body, wherein each supporting pin crosses through corresponding holes made in the backing plate for the friction material of each brake pad. Such supporting pins have a longitudinal extension axis, a pin head, and a pin tip arranged on opposite ends of the extension axis.

The supporting pins are coupled with clearance relative to the respective caliper body housing and consequently elastic elements are used to axially constrain the pins to the caliper body housings.

In some cases, such elements are pre-assembled coaxially to the pin in a pin housing. The pin housing, in which the elastic element is accommodated, provides an axially extending, usually cylindrical, end wall, axially delimited by a first abutment wall and a second abutment wall, wherein the abutment walls are substantially transverse to the bottom wall unless flared machining connectors are provided.

Such elastic elements are usually expanding elastic elements and have a larger radial dimension than the radial dimension of the first and second abutment walls in a resting condition. In this manner, when the supporting pin provided with the expanding elastic element is assembled to the caliper body, the expanding elastic element is radially compressed by the walls of the caliper body housing in the direction of the supporting pin, and the expanding elastic element is constrained by friction to the caliper body housing. As a result, the expanding elastic element provides an axial constraint aimed at preventing the pin from falling out of its housing.

The expanding elastic element is inserted by sliding inside the caliper body housing, e.g., under the thrust action of the abutment wall distal to the pin tip. Once the expanding elastic element is positioned inside the caliper body housing, the elastic element forms an axial constraint relative to the pin thereby preventing the movements of the pin in the extraction direction until the action in the axial direction applied by the abutment wall proximal to the pin tip of the pin housing exceeds the static friction force between the elastic element and the caliper body, allowing the sliding of the elastic element relative to the caliper body and, consequently, allowing the pin to exit from its housing.

For example, document EP1425520 by the applicant, shows a brake pad supporting pin coupled to a barrel-shaped expanding elastic element.

The shape of the supporting pins and the respective expanding elastic elements is such to satisfy the need to guarantee an easy assembly of a brake caliper assembly, as well as a simple replacement of the brake pads, e.g., during maintenance, and at the same time to satisfy the need to guarantee an axially constrained coupling between the supporting pins and the caliper body during vehicle use, withstanding the operating biases. In other words, the shape of the supporting pins and the respective expanding elastic elements is such that the pin can only be inserted into and extracted from the caliper body by applying an extraction effort approximately equal in magnitude to the insertion effort overcoming the same limit sliding load, given by the force applied by the elastic element in the direction normal to the wall of the caliper body housing, in other words by the pre-compression force of the elastic element due to insertion into the caliper body housing, multiplied by the friction coefficient between the two surfaces.

Although such pins meet such requirements with good margins of stability within the normal operating conditions of the vehicle, it has been found that under extreme operating conditions, the biases acting on the supporting pins of known type may be such to disengage the supporting pin from its housing, generating effects of noise in the system.

Therefore, the need is strongly felt in the industry to devise a supporting pin and elastic element assembly which can stably maintain its position or rather can resist extraction even in very severe operating situations, and which at the same time makes it possible to satisfy the conflicting need of devising a supporting pin and elastic element assembly which can be easily inserted into the caliper body during the brake system assembly and maintenance.

Therefore, the problem underlying the present invention is to provide a supporting pin and elastic element assembly, a brake caliper, and a method of interaction of a pad supporting pin and axially constraining elastic element assembly, which have structural and functional features to satisfy the aforesaid requirements and, at the same time, solve the drawbacks mentioned with reference to the prior art and satisfy the aforesaid felt needs.

Solution

It is an object of the present invention to provide a pad supporting pin and axially constraining elastic element assembly, as well as a brake caliper comprising said assembly and an interaction method for a pad supporting pin and an axially constraining elastic element, which allow a stable coupling between the supporting pin and the respective housing seat also in extreme biasing conditions and at the same time allow easy maintenance and assembly.

This and other objects and advantages are achieved by a brake pad supporting pin and axially constraining elastic element assembly, a brake caliper and an interaction method for a pad supporting pin and an elastic retaining element as described and claimed herein.

Some advantageous embodiments are also described.

The analysis of this solution shows that the suggested solution achieves an increase in the extraction sliding limit force of an elastic axially constraining element which must be overcome to extract a brake pad supporting pin from a caliper body.

Furthermore, the suggested solution makes it possible to increase the sliding limit force of the axially constraining elastic element as the axial force acting on the pad supporting pin in the extraction direction increases.

Additionally, the suggested solutions make it possible to keep unchanged the insertion sliding limit force of an axially constraining elastic element which must be overcome to insert the pad supporting pin and the respective elastic constraining element into the caliper body.

Even further, by virtue of the suggested solutions, it is possible to reduce or avoid the accidental removal of brake pad supporting pins from the caliper body due to an unexpected increase of biasing on the pin.

Even further, by virtue of the suggested solutions, it is possible to guarantee resistance to the sliding of a supporting pin increased by a value depending on the tapering angle, defined in design step according to the application requirements, of a portion of tapered pin wedged in the elastic element compared to the use of brake pad supporting pin and axially constraining elastic element assemblies of known type.

Even further, by virtue of the suggested solutions, it is possible to supply brake pad supporting pin and axially constraining elastic element assemblies customized according to guiding requirements.

FIGURE

Further features and advantages of the pad supporting pin and axially constraining elastic element assembly, the brake caliper, and the method by way of non-limiting examples, with reference to the accompanying drawings, in which:

FIGS. 1*a* and 1*b* show an axonometric view of a pad supporting pin assembly and axially constraining elastic element according to the present invention;

FIGS. 2*a* and 2*b* show an enlarged detail of FIGS. 1*a* and 1*b* respectively, in a partially sectioned view along a plane passing through the pin axis X-X, in which the shape of the pin portion and the elastic element fitted on it is shown in detail;

FIGS. 3*a* and 3*b* show further embodiments of the assembly of FIG. 2*b* according to the present invention;

FIG. 4 shows a partially exploded axonometric view of a brake caliper according to the present invention comprising a caliper body and at least one assembly according to the present invention;

FIGS. 5*a* and 5*b* show in a section plan view of the brake caliper of FIG. 4 on a horizontal plane parallel to the axes X-X of the two assemblies according to the present invention, an insertion sequence of at least one assembly according to the present invention into the caliper body;

DESCRIPTION OF SOME PREFERRED EMBODIMENTS

Figure 1A:
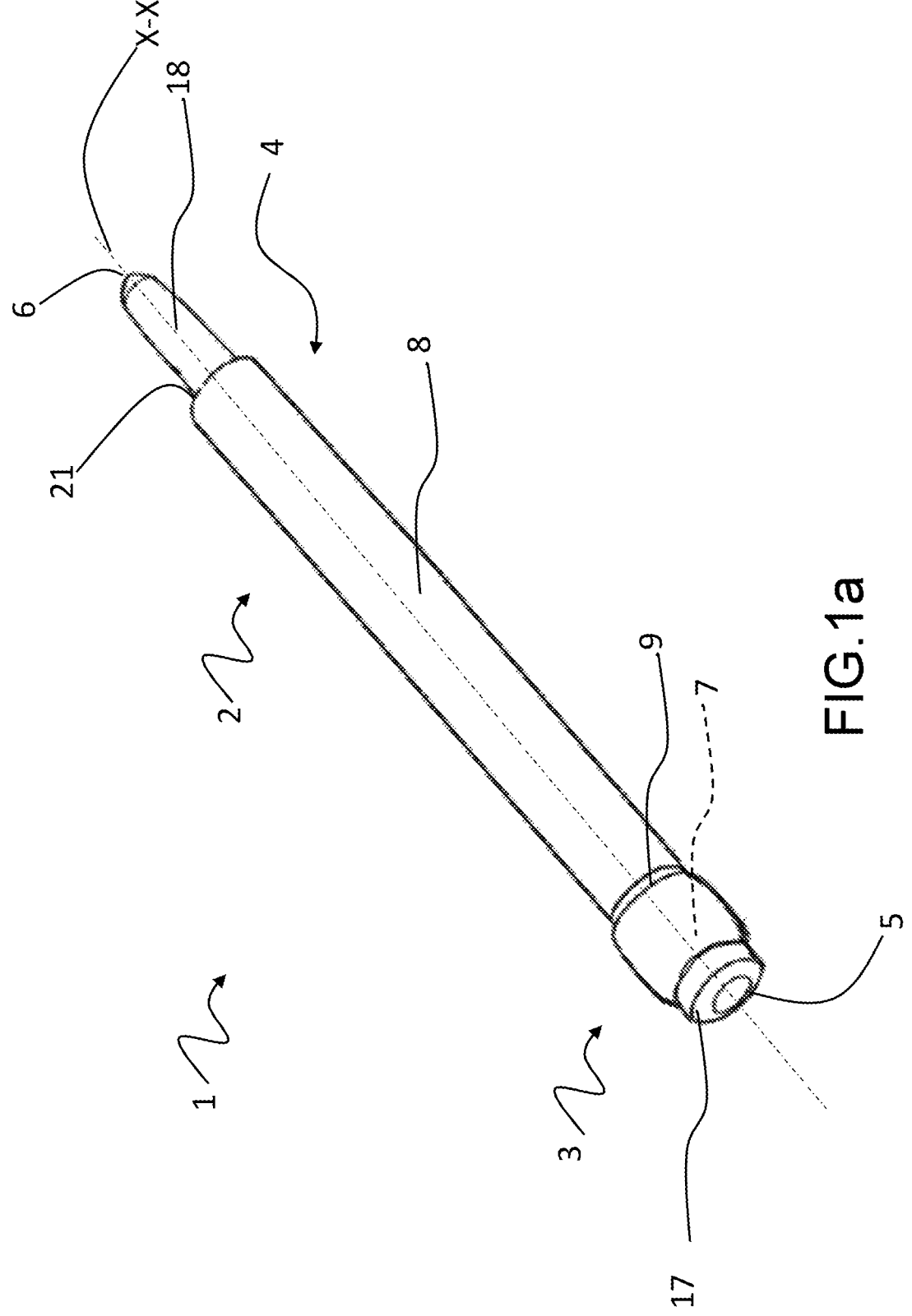
Figure 1B:
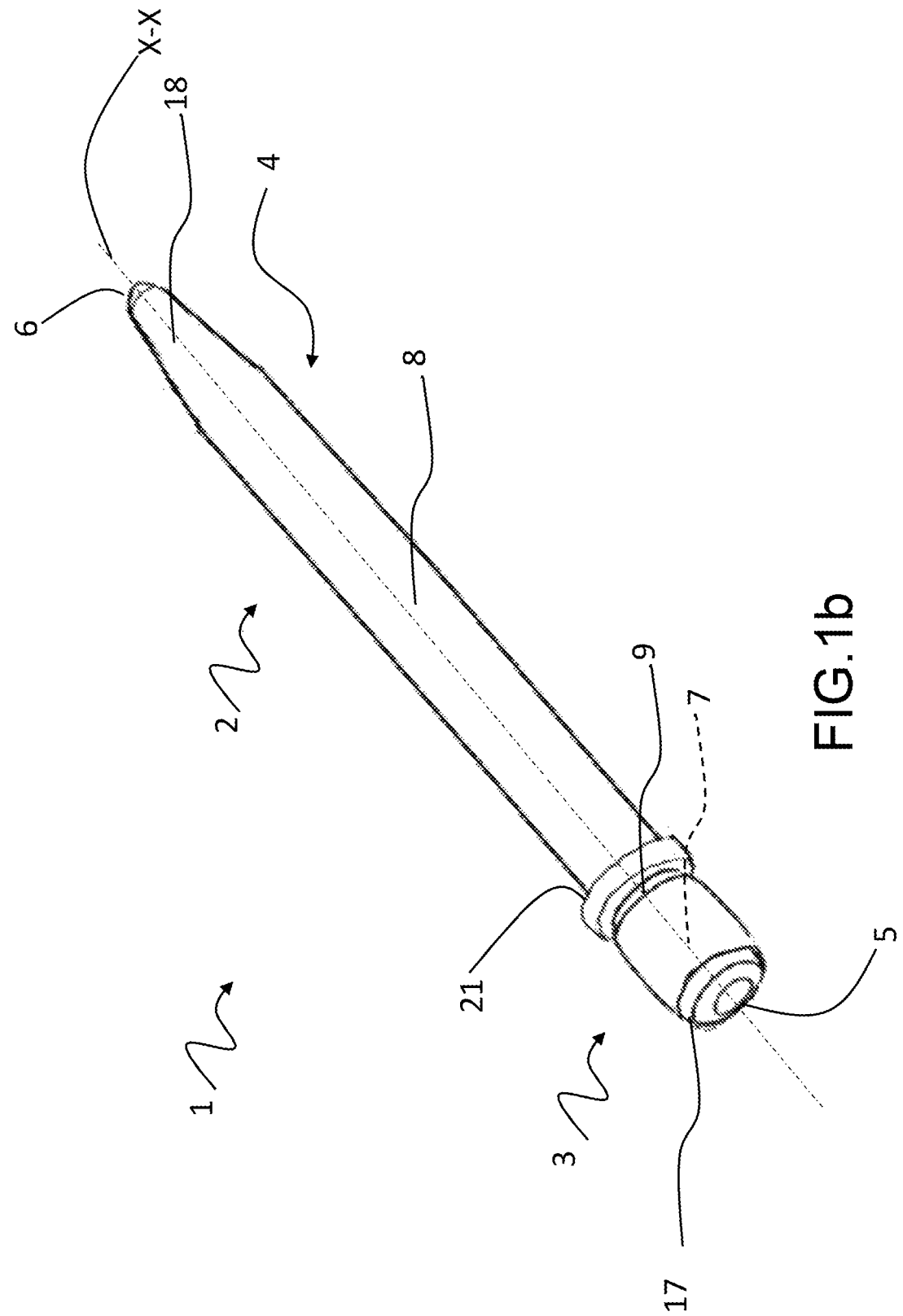
Figure 2A:
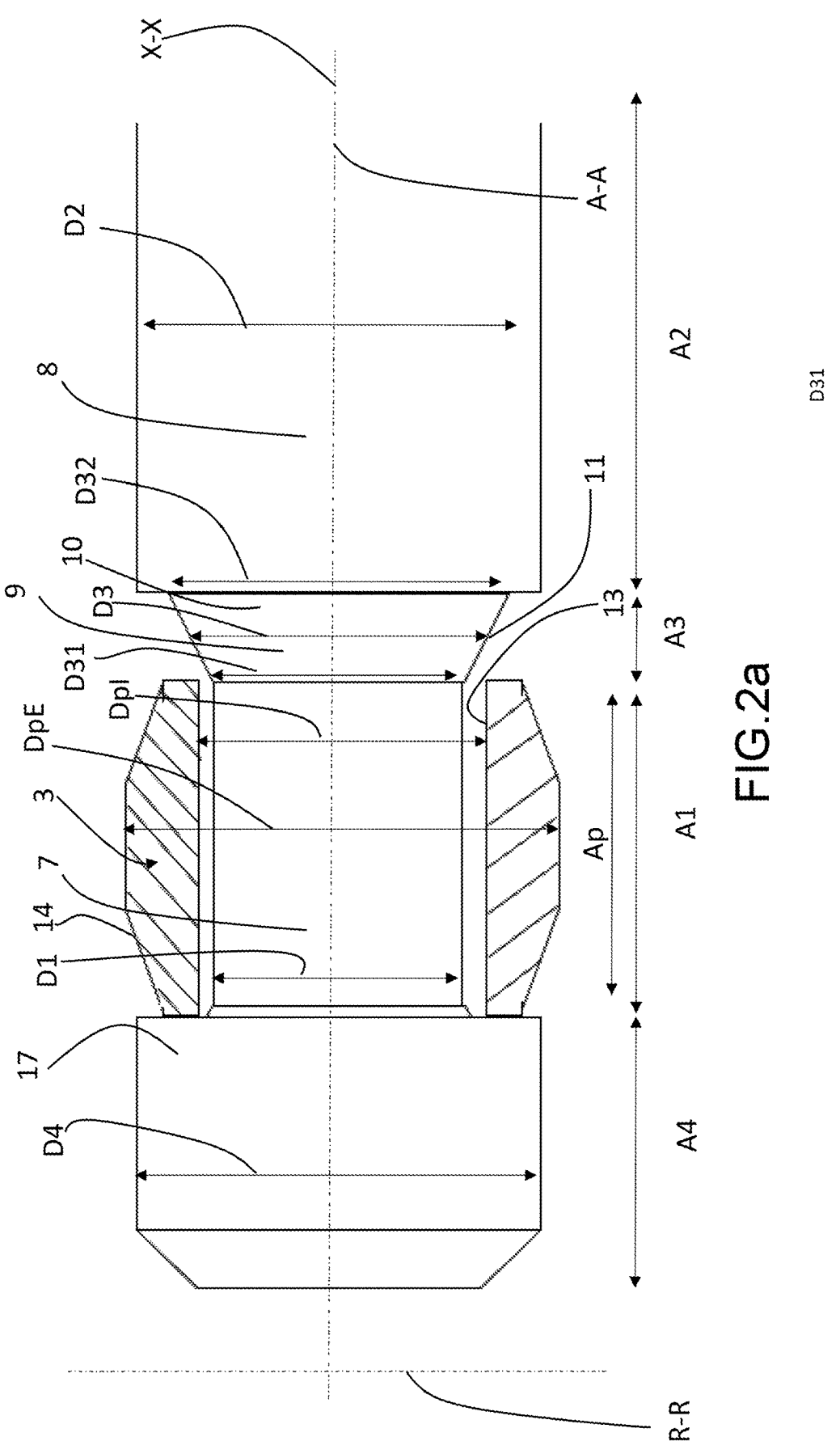
Figure 2B:
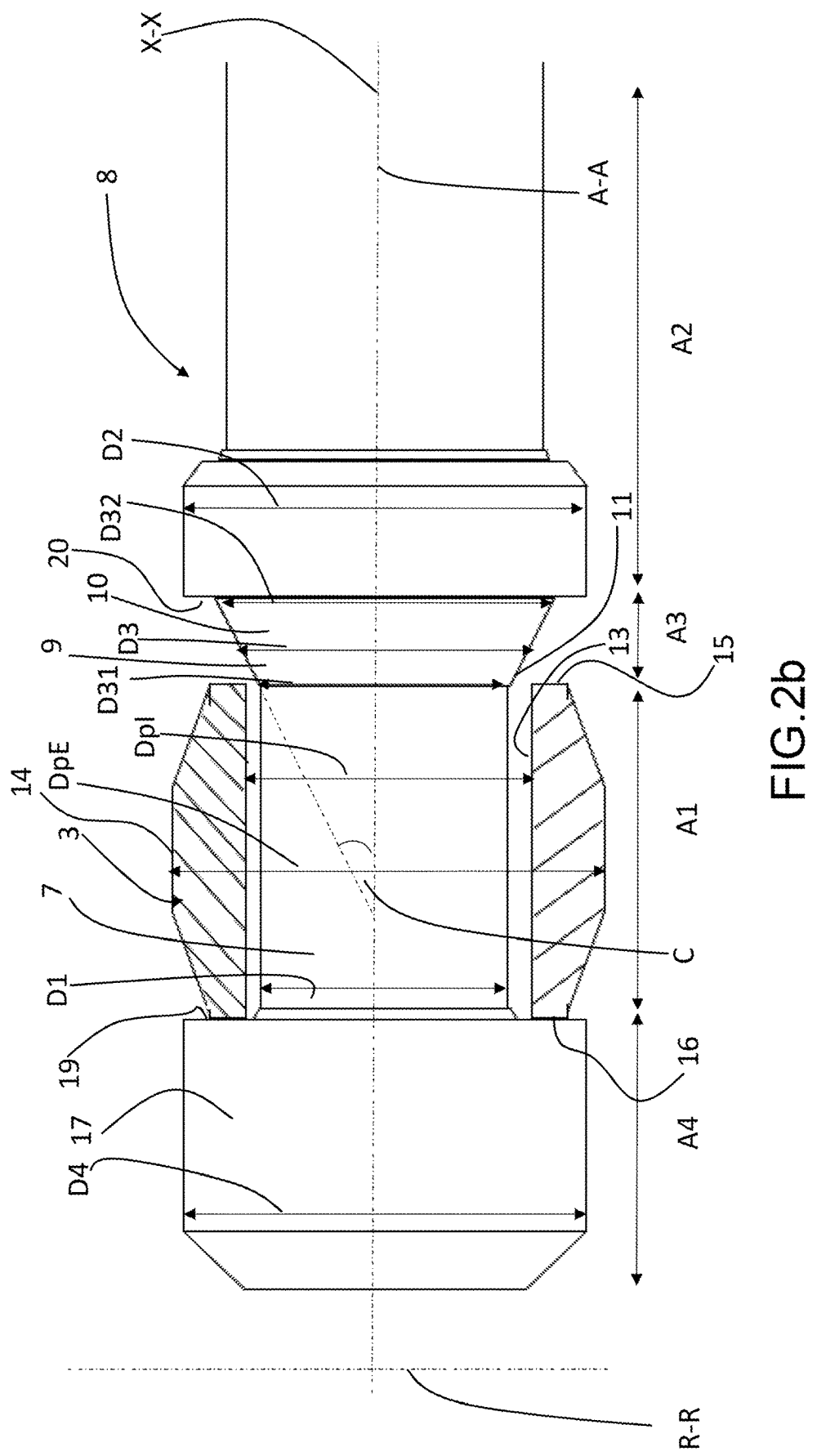
Figure 3A:
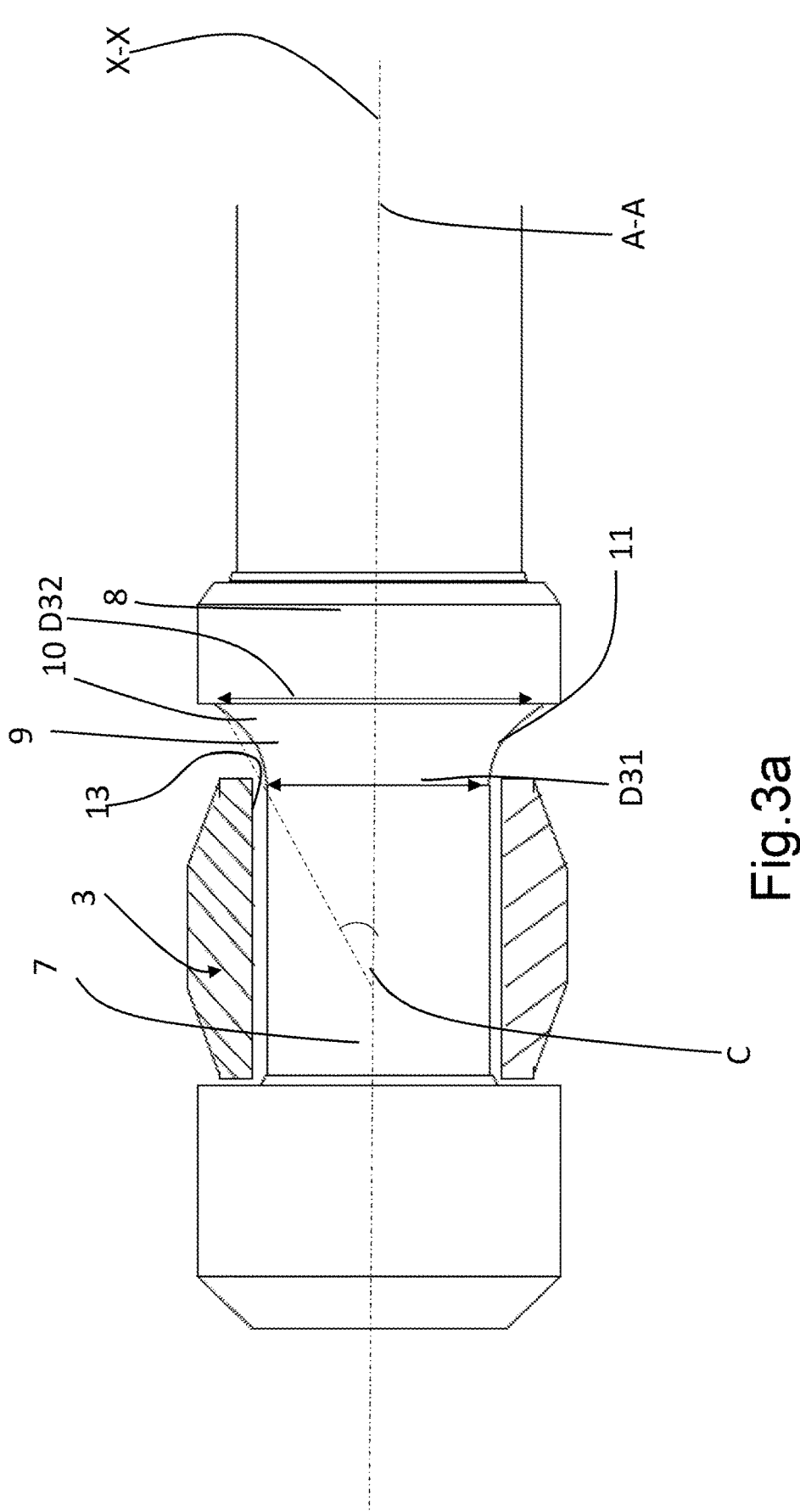
Figure 3B:
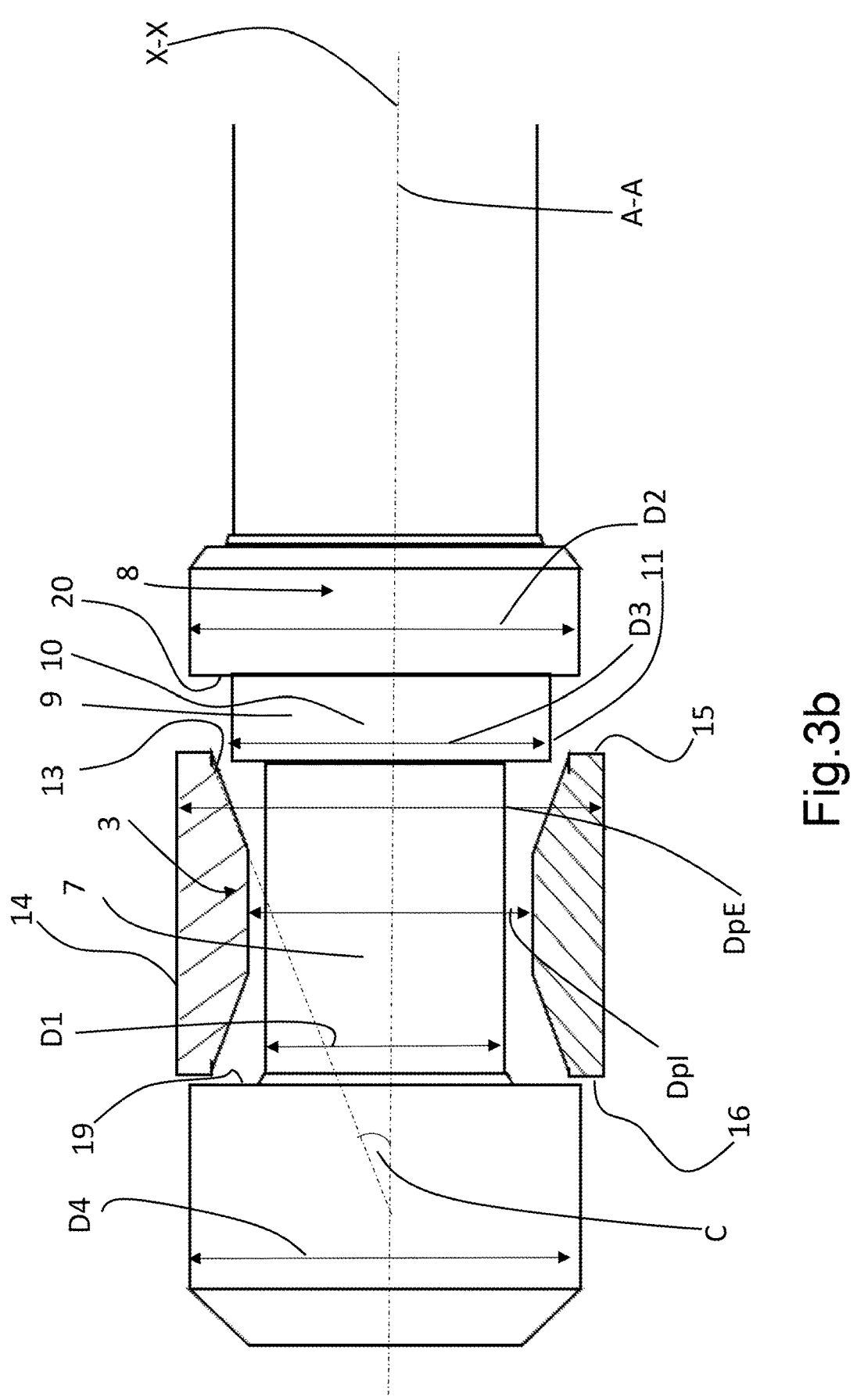
Figure 4:
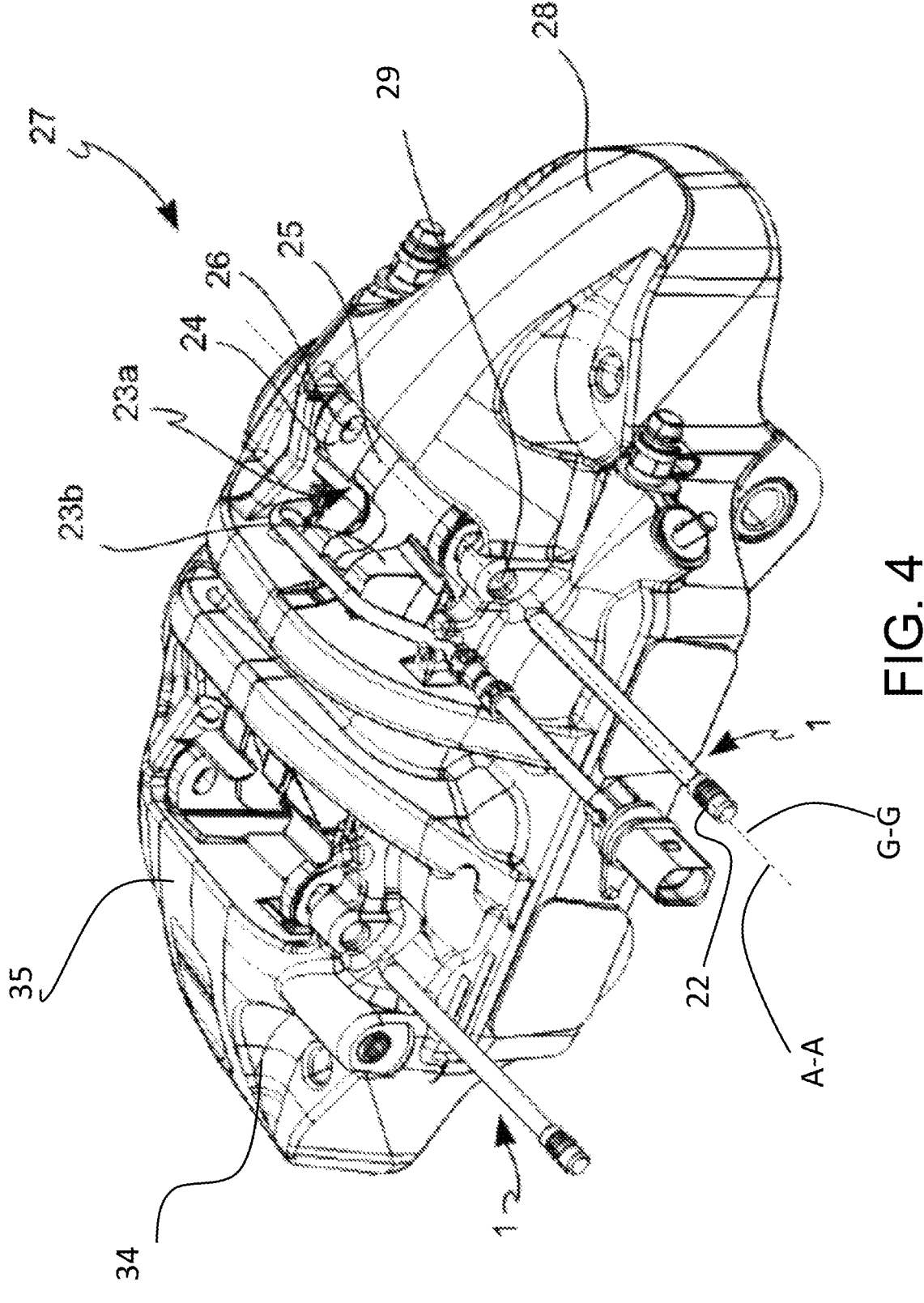
Figure 5A:
Figure 5B:
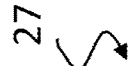
Figure 6:
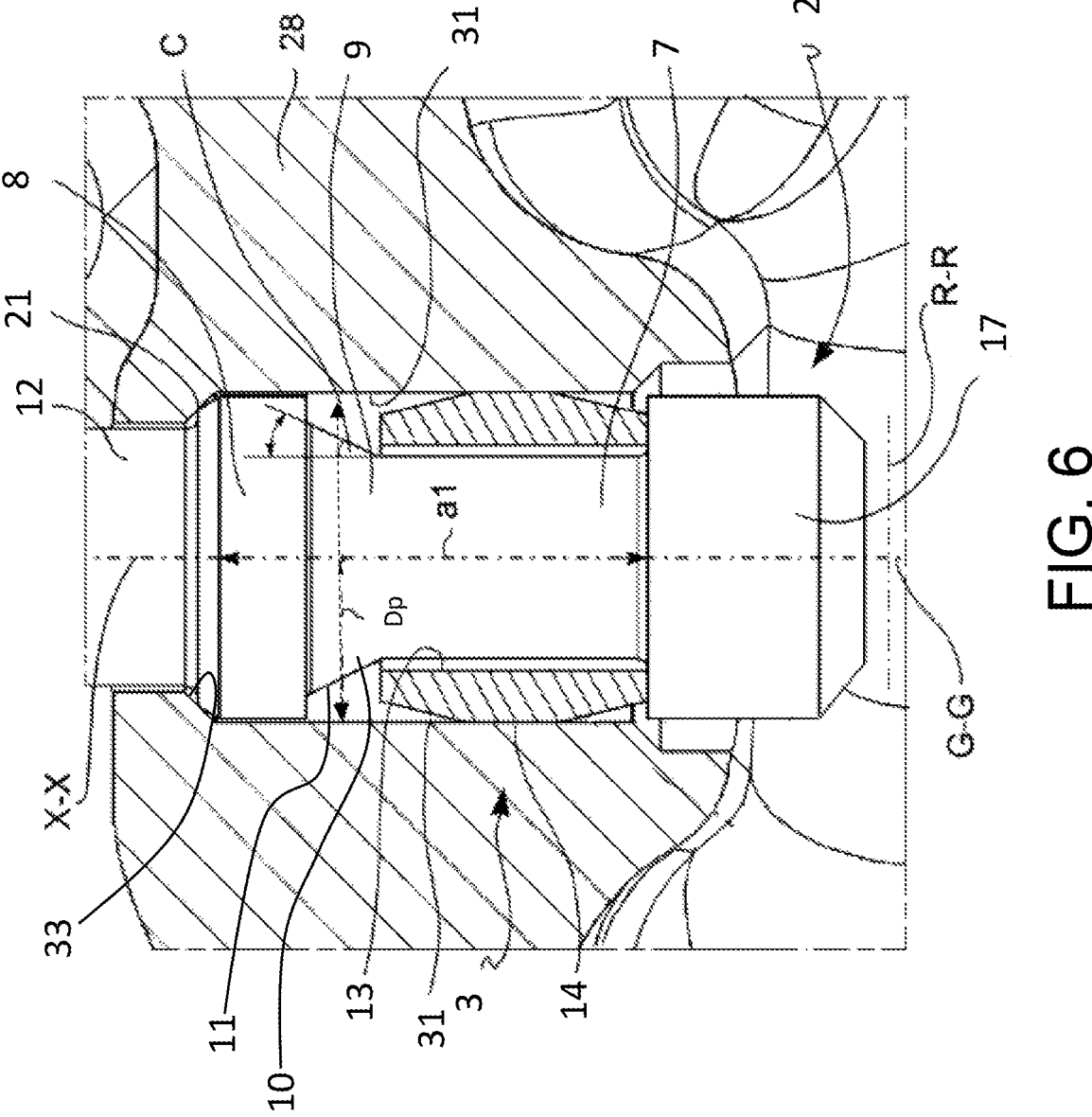
FIG. 6 shows an enlarged detail of the section plan view of FIG. 5*b*, when said pin and elastic element assembly is housed in the caliper body, in particular, the pin head is shown housed in the corresponding housing of the caliper body in which the elastic element creates an axial constraint which limits the sliding of said pin outside the caliper body.
Figure 7:
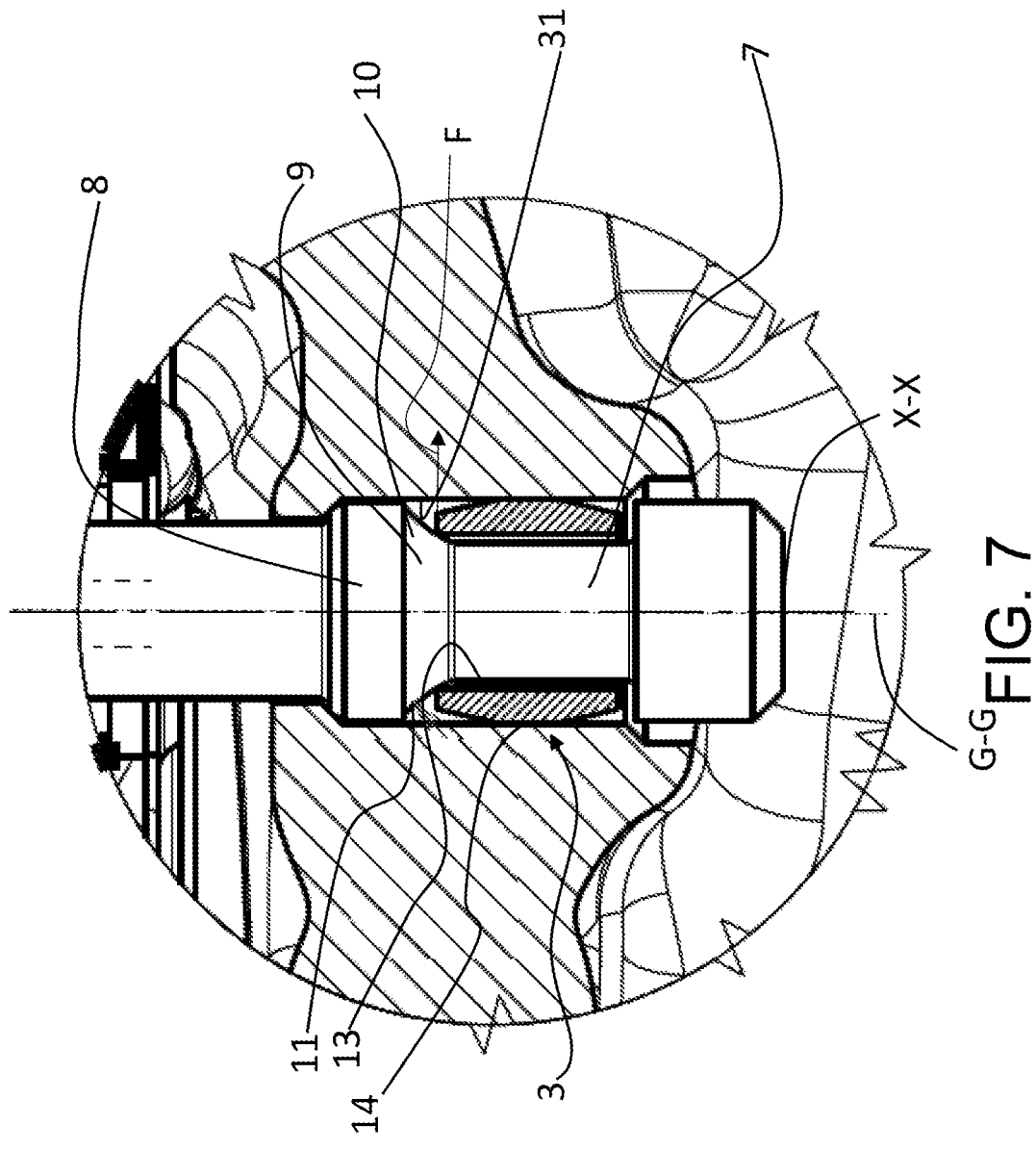
FIG. 7 shows a section plan view of the brake caliper of FIG. 5*b*, a detail of the assembly housed in the caliper body according to a further embodiment.
Figure 8:
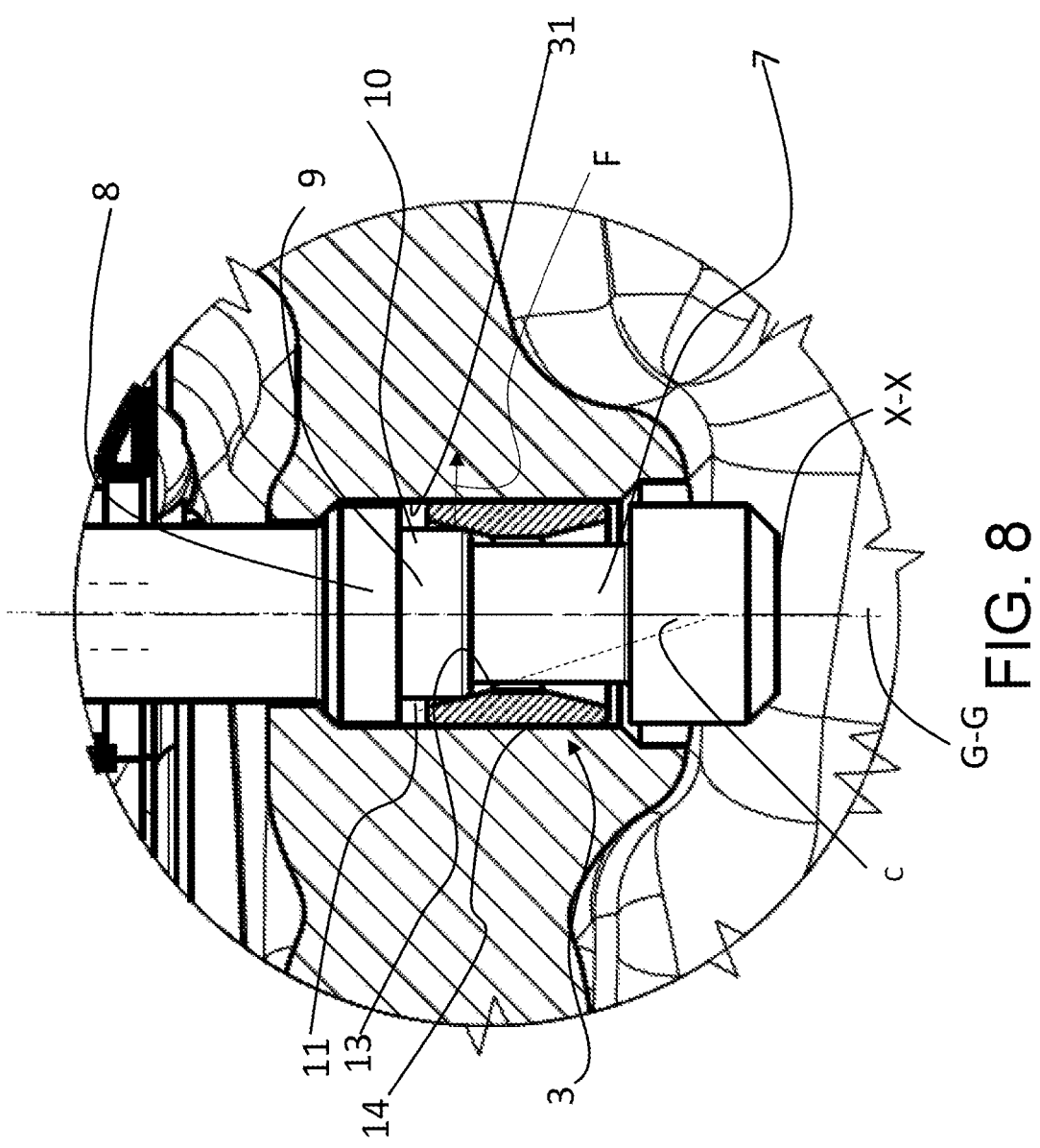
FIG. 8 shows a section plan view of the brake caliper of FIG. 5*b*, a detail of the assembly housed in the caliper body according to a further embodiment, in which the profile of the pin third portion is stepped and the inner profile of the elastic element is shaped so that the profile of the pin third portion wedges into the inner profile of the elastic element.
Figure 9:
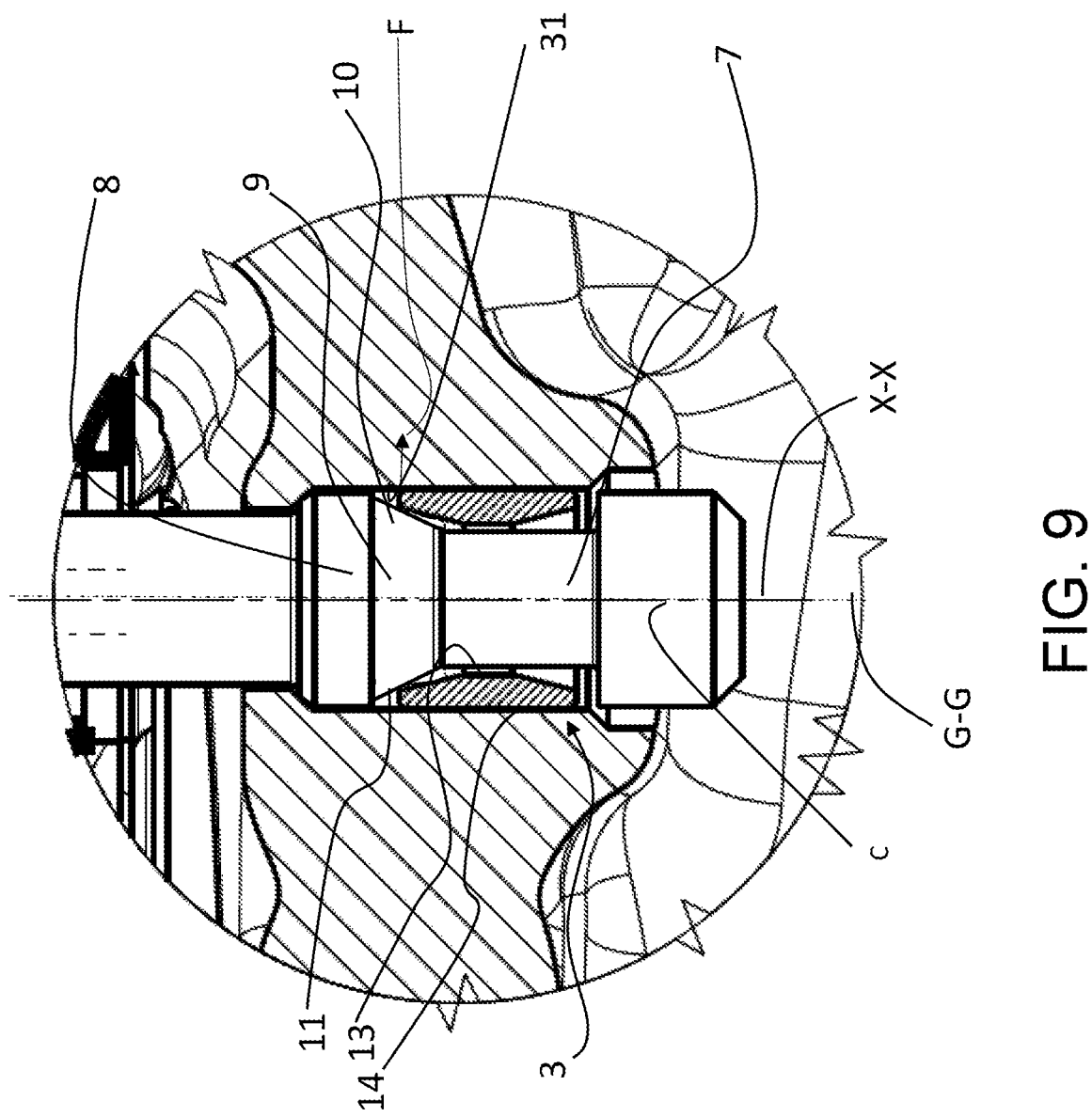
FIG. 9 shows a section plan view of the brake caliper of FIG. 5*b*, a detail of the assembly housed in the caliper body according to a further embodiment, in which the profile of the pin third portion is shaped and the inner profile of the elastic element is shaped so that the profile of the pin third portion wedges into the inner profile of the elastic element.
Figure 10:
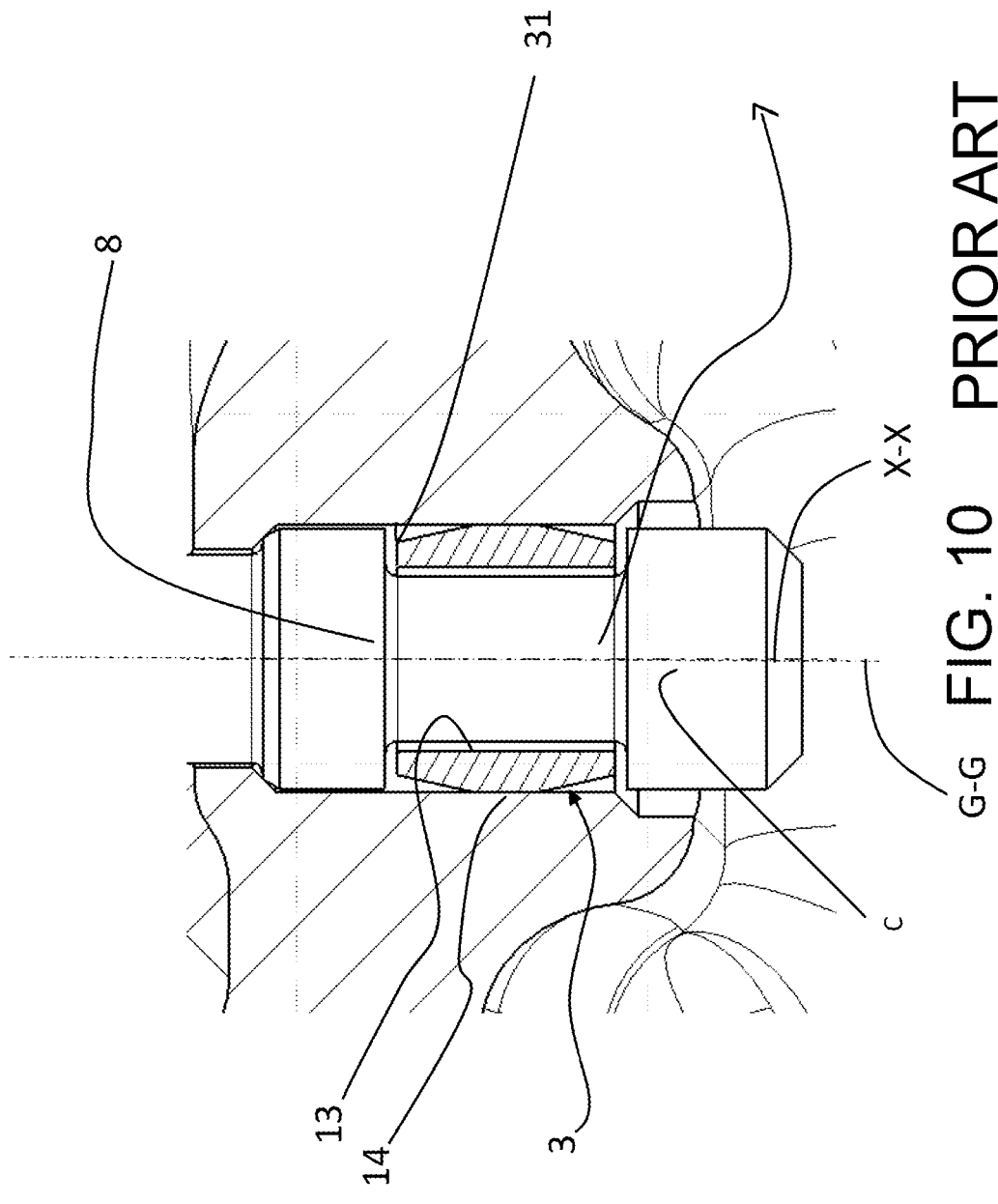
FIG. 10 shows a section plan view of an enlarged detail of a pin and elastic element assembly according to the prior art inserted into a caliper body housing.

According to a general embodiment, a brake pad pin and elastic axially constraining element assembly 1 is indicated by reference numeral 1 as a whole.

Said assembly 1 comprises a brake pad supporting pin 2 and an elastic element 3.

Said brake pad supporting pin 2 comprises a pin body 4 which extends along a pin axis X-X between a head end 5 and a tip end 6.

Said pin axis X-X defines an axial direction A-A, either coincident with or parallel to said pin axis X-X, and a radial direction R-R transverse to said axial direction A-A.

Said pin body 4 comprises in sequence along said axial direction A-A towards said tip end 6 at least one pin first portion 7 having at least one pin first portion diameter D1, and a pin second portion 8 having at least one pin second portion diameter D2.

According to an embodiment, said at least one pin second portion diameter D2 is greater than said at least one pin first portion diameter D1.

Said elastic element 3 is arranged on said pin body 4 at least at said pin first portion 7.

Said elastic element 3 has at least one elastic element inner diameter DpI and at least one elastic element outer diameter DpE.

Said at least one elastic element outer diameter DpE is either greater than or equal to said at least one pin second portion diameter D2.

According to an embodiment, said at least one elastic element inner portion DpI is smaller than said at least one pin second portion diameter D2.

Said pin body 4 comprises a pin third portion 9 arranged between said pin first portion 7 and said pin second portion 8.

The pin third portion 9 has at least one pin third portion stretch 10 having at least one pin third portion diameter D3 which is greater than the at least one elastic element inner diameter DpI.

Said elastic element 3 comprises an elastic element inner profile 13 facing towards said pin body 4.

The pin third portion 9 comprises a pin third portion profile 11 which connects the pin first portion and the pin second portion 8.

When the pin third portion 9 is biased towards the elastic element 3 or vice versa, the pin third portion profile 11 is wedged at least partially into the elastic element inner profile 13 so that the pin third portion stretch 10 biases the elastic element 3 at least in a radial direction R-R outwards with a biasing force F.

The elastic element 3 is deformable towards and away from the pin axis X-X between at least one compressed configuration, in which the elastic element is compressed by a containing surface, e.g., a housing made in a caliper body, and at least one resting configuration, in which the elastic element is, e.g., outside the caliper body. In this description, the elastic element outer diameter DpE is considered to be larger than each pin second portion diameter D2 in both the compressed and resting configurations. Instead, it is considered that the elastic element inner diameter DpI is smaller than said pin second portion diameter D2 at least in the compressed configuration. Similarly, the elastic element inner diameter DpI is considered to be less than at least one third portion diameter D3 of the at least one third portion stretch 10 at least in the compressed configuration.

According to an embodiment, said at least one elastic element outer diameter DpE is the greater outer diameter of said elastic element 3.

According to an embodiment, said at least one elastic element inner diameter DpI is the smaller inner diameter of said elastic element 3.

According to an embodiment, said elastic element outer diameter DpE measured in at least one elastic element section traverse to axial direction A-A, is either greater than or equal to the pin second portion diameter D2 measured in each pin second portion section traverse to pin axis X-X.

According to an embodiment, the elastic element inner profile 13 and the pin third portion profile 11 are mutually shaped so that the biasing force F increases when the pin head second portion 8 and the elastic element 3 approach each other.

According to an embodiment, said elastic element inner profile 13 has an elastic element constant inner diameter equal to said at least one elastic element inner diameter DpI.

According to an embodiment, said elastic element inner profile 13 increases radially between an elastic element minimum diameter equal to said at least one elastic element inner diameter DpI to an elastic element maximum inner diameter at least towards said pin second portion 8.

According to an embodiment, said pin third portion profile 11 at least at said pin third portion stretch 10 increases radially in the direction of said pin second portion 8 between a pin third portion minimum diameter D31 and a pin third portion maximum diameter D32.

According to an embodiment, said elastic element inner diameter DpI is comprised between said pin third portion minimum diameter D31 and said pin third portion maximum diameter D32 such that said pin third portion stretch 10 is wedged biasing said elastic element 3 in a radially increasing direction.

According to an embodiment, said pin third portion profile 11 increases radially in the direction of said pin second portion 8 in a linear manner. In other words, said pin third portion profile 11 forms a truncated cone surface in space.

According to an embodiment, said pin third portion profile 11 increases radially in the direction of said pin second portion 8 in a curvilinear manner. In other words, said pin third portion profile 11 forms a paraboloid surface in space.

According to an embodiment, said pin third portion profile 11 increases radially in the direction of said pin second portion 8 in a radial manner. In other words, said pin third portion profile 11 forms a flared surface in space.

According to an embodiment, said pin third portion profile 11 radially increases in the direction of said pin second portion 8 connecting said pin first portion 7 and said pin second portion 8 between said pin third portion minimum diameter D31 and said pin third portion maximum diameter D32.

According to an embodiment, the pin third portion minimum diameter D31 is equal to the at least one pin first portion diameter D1.

According to an embodiment, said pin third portion maximum diameter D32 is either smaller than or equal to said pin second portion diameter D2.

According to an embodiment, said pin third portion minimum diameter D31 is either smaller than or equal to said elastic element constant inner diameter.

According to an embodiment, said pin third portion 9 is a tapered pin portion which increases radially in the direction of said pin second portion 8 between said pin third portion minimum diameter D31 and said pin third portion maximum diameter D32 at a tapering angle C relative to said pin axis X-X.

According to an embodiment, said tapering angle C is smaller than 45 degrees.

According to an embodiment, said tapering angle C is comprised between 5 and 35 degrees.

According to an embodiment, said tapering angle C is comprised between 12 and 26 degrees.

According to an embodiment, said tapering angle is smaller than 60 degrees.

According to an embodiment, said elastic element 3 comprises an elastic element outer profile 14 facing outwards in the radial direction.

According to an embodiment, said elastic element outer profile 14 increases radially between an elastic element maximum diameter equal to said at least one elastic element outer diameter DpE to an elastic element minimum inner diameter at least towards said pin second portion 8.

According to an embodiment, said elastic element outer profile 14 decreases radially between said elastic element maximum outer diameter equal to said at least one elastic element outer diameter DpE, and said elastic element minimum inner diameter towards said head end, facing in the opposite direction relative to said pin second portion 8.

According to an embodiment, said elastic element 3 has an elastic element longitudinal extension along said axial direction A-A.

According to an embodiment, said pin first portion 7 has a pin first portion longitudinal extension along said axial direction A-A.

According to an embodiment, said pin second portion 8 has a pin second portion longitudinal extension along said axial direction A-A.

According to an embodiment, said pin third portion 9 comprises a pin third portion longitudinal extension along said axial direction A-A.

According to an embodiment, the elastic element inner diameter DpI measured in at least a first section of the elastic element 3 transverse to the pin axis X-X along the elastic element longitudinal extension is either smaller than or equal to the pin third portion diameter D3 measured in at least a first section of the pin third portion 9 transverse to the pin axis X-X along the pin third portion longitudinal extension.

According to an embodiment, the elastic element inner diameter DpI measured in at least a second section of the elastic element 3 transverse to the pin axis X-X along the elastic element longitudinal extension is either greater than or equal to the pin third portion diameter D3 measured in at least a second section of the pin third portion 9 transverse to the pin axis X-X along the elastic element longitudinal extension.

According to an embodiment, said second section transversal to said pin axis X-X of said elastic element 3 is in an advanced position relative to said first section transversal to said pin axis X-X of said elastic element 3 in the direction of said pin second portion 8.

According to an embodiment, the first section of the pin third portion 9 transverse to the pin axis X-X is in an advanced position in the direction of the pin second portion 8 relative to the second section of the pin third portion 9 transverse to the pin axis X-X.

According to an embodiment, said pin third portion 9 is substantially a pin shoulder having a constant diameter equal to said pin third portion diameter D3.

According to an embodiment, the pin third portion profile 11 is connected with a step to the pin first portion 7 and the pin second portion 8.

According to an embodiment, said elastic element inner profile 13 increases radially between an elastic element minimum diameter equal to said at least one elastic element inner diameter DpI to a maximum elastic element inner diameter at least towards said pin second portion 8 with a tapering angle C.

According to an embodiment, said pin third portion diameter D3 is comprised between said elastic element maximum inner diameter and said elastic element minimum inner diameter so that said pin third portion stretch 10 is wedged biasing said elastic element 3 in a radially increasing direction.

According to an embodiment, said elastic element 3 comprises an elastic element outer profile 14 facing outwards in the radial direction. Said elastic element outer profile 14 has a constant diameter equal to said at least one elastic element outer diameter DpE.

According to an embodiment, said pin body 4 comprises a pin head 17 having a pin head diameter D4.

According to an embodiment, said pin head 17 is connected to said pin first portion 7.

According to an embodiment, said pin head diameter D4 is larger than said elastic element inner diameter DpI.

According to an embodiment, the pin head 17 defines a pin radial first wall 19 facing in the direction of the tip end 6 and configured to axially abut with the elastic element 3.

According to an embodiment, the pin radial first wall 19 extends radially between a radially inner edge having a diameter equal to the pin first portion diameter D1 to a radially outer edge having a diameter equal to the pin head diameter D4.

According to an embodiment, said pin body 4 comprises a pin tip 18 connected to said pin second portion 8 and has a tapered shape in the direction of said tip end 6.

According to an embodiment, said pin second portion 8 comprises at least one pin abutment wall 21 facing towards said tip end 6 configured to abut against a caliper body portion.

According to an embodiment, said pin second portion 8 comprises a pin stem which has a stem diameter smaller than a pin second portion maximum diameter D2.

According to an embodiment, said pin second portion defines a pin radial second wall 20 facing in the direction of said head end 5 configured axially abut against said elastic element 3.

According to an embodiment, said pin radial second wall 20 extends in a radial direction from a radially inner edge, preferably having a diameter equal to said pin third portion maximum diameter D32, to a radially outer edge having a diameter equal to said pin second portion diameter D2.

According to an embodiment, said elastic element 3 comprises an elastic element first radial wall 15 configured to abut against at least one corresponding pin abutment wall, preferably said pin radial first wall 19.

According to an embodiment, said elastic element first radial wall 15 faces in the direction of said pin second portion 8.

According to an embodiment, said elastic element radial first wall 15 extends between a radially inner edge having a diameter equal to said elastic element inner diameter DpI and a radially outer edge having a diameter equal to said elastic element outer diameter DpE.

According to an embodiment, said elastic element radial first wall 15 is perpendicular to said axial direction A-A.

According to an embodiment, the elastic element comprises an elastic element second radial wall 16 configured to abut against with at least one corresponding pin abutment wall, preferably the pin radial second wall 20.

According to an embodiment, said elastic element radial second wall 16 faces in a direction opposite to said pin second portion 8.

According to an embodiment, said elastic element radial second wall 16 extends between a radially inner edge having a diameter equal to said elastic element inner diameter DpI to a radially outer edge having a diameter equal to said elastic element outer diameter DpE.

According to an embodiment, said elastic element second radial wall 16 is perpendicular to said axial direction A-A.

According to an embodiment, said elastic element 3 has an annular and/or tubular shape.

According to an embodiment, said elastic element comprises an elastic element through opening 22 parallel to said axial direction A-A.

According to an embodiment, said elastic element axial extension Ap is smaller than said pin head first portion axial extension A1.

According to an embodiment, said pin head third portion axial extension A3 is equal to at least ⅙ of the elastic element axial extension Ap.

According to an embodiment, the pin third portion 9 is shaped so that, when the pin second portion 8 and the elastic element 3 approach each other, the pin third portion 9 biases the elastic element 3 with a pin biasing force F having an axial force component Fa and a radial pin force component Fr, wherein the radial pin force component Fr increases according to the tapering angle C.

According to an embodiment, as an axial biasing force applied to said pin 2 increases, said pin third portion 9 biases said elastic element 3 with said increased pin biasing force F, wherein said radial component of pin force Fr increases.

Advantageously, by virtue of the shape of the pin head third portion 9 having a pin third portion profile 11 configured to wedge the elastic element 3, when said pin head second portion 8 and said elastic element 3 approach each other, the pin third head portion 9 allows biasing the elastic element 3 deforming it in the radial direction R-R away from said pin axis X-X. As a consequence, when said elastic element 3 is pre-compressed in the radial direction R-R in the direction of said pin axis X-X, said pin third portion 9 makes it possible to increase the compression of said elastic element 3 and consequently the sliding limit effort to be overcome to extract the pin from the respective caliper body housing.

According to an embodiment, the pin first portion 7 and said second the pin second portion 8 are cylindrical pin portions.

According to an embodiment, said pin third portion 9 is a tapered pin portion. According to an embodiment, said tapered pin portion is truncated-cone-shaped or curvilinear.

According to an embodiment, said pin second portion 8, said pin third portion 9, and said pin first portion 7 are mutually connected with respective pin connection portions. The respective connection portions may have connection angles or connection radii to connect the different pin head portions.

According to an embodiment, said elastic element inner profile 13 defines an elastic element first sliding wall and said elastic element outer profile defines an elastic element second sliding wall.

According to an embodiment, said elastic element first sliding wall is configured to slide at least partially on said pin third portion 9. Said elastic element second sliding wall is adapted to slide on a containing wall, e.g., a wall of a caliper body housing 28, and is adapted to abut against said caliper body housing wall 32 to form a friction constraint to prevent said pin 2 from exiting from the caliper body 28.

According to an embodiment, said elastic element 3 is shaped like an upside-down barrel.

According to an embodiment, said elastic element 3 is "barrel"-shaped.

According to an embodiment, said pin 2 is axisymmetric. According to an embodiment, said pin 2 is centrally symmetric.

According to an embodiment, said elastic element 3 is axisymmetric, unless an axial opening 22 is present. According to an embodiment, said pin 2 is centrally symmetric unless an axial opening 22 is present.

According to an embodiment, when said elastic element 3 and said pin second portion 8 approach each other, the pin third portion 9 comes into contact with said first sliding wall and by virtue of the provision of said tapered or stepped sliding wall, the elastic element compresses and the second sliding wall forms a second sliding wall contact of greater magnitude with a retaining wall, e.g., a cylindrical wall of caliper body first housing 31, and consequently increases the maximum sliding limit which must be exceeded to extract said pin 2 from a caliper body 28.

The present invention further relates to a maintenance kit comprising at least one assembly 1 as previously described, and at least one brake pad 23*a*, 23*b*. Each brake pad 23*a*, 23*b* has a backing plate 24 connected to a friction material 25, wherein each backing plate 24 comprises at least one plate through hole 26 for housing said brake pad supporting pin 2.

The present invention further relates to a brake caliper 27 comprising a caliper body 28 and at least one assembly 1, as described above.

The caliper body 28 comprises a first elongated element 34 and a second elongated element 35, the first elongated element 34 comprises at least a caliper body first housing 29 and the second elongated element 35 comprises at least a caliper body second housing 30, wherein the caliper body first housing 29 and the caliper body second housing 30 each have a housing axis G-G parallel to and coincident with the pin axis X-X, wherein the caliper body first housing 29 comprises at least one first housing first portion 31, the caliper body first housing 29 having a prevalent longitudinal extension and having a caliper body first housing diameter Dp, and the caliper body second housing 30 having a prevalent longitudinal extension and having a caliper body second housing diameter Ds, wherein the pin second portion 8 is at least partially housed, e.g., with said stem 12, in the caliper body second housing 30 and the pin first portion 7 is housed with clearance in the caliper body first housing 29, and the elastic element 3 is housed in the first housing first portion 31.

Said elastic element outer diameter DpE is either greater than or equal to said first housing diameter Dp to make an axial constraint opposing an extraction in an axial direction A-A of said supporting pin 2 from the caliper body 28.

According to an embodiment, said elastic element outer diameter DpE measured in at least one section of said elastic element 3 transverse to said pin axis X-X along its longitudinal extent is either greater than or equal to said first housing diameter Dp measured in at least one section transverse to said housing axis G-G of said first housing first portion 31 along its longitudinal extent to form an axial constraint which opposes an extraction in axial direction A-A of said supporting pin 2 from the caliper body 28.

According to an embodiment, said caliper body first housing 29 comprises a first caliper body housing cylindrical wall 31.

According to an embodiment, said caliper body first housing 29 comprises a first caliper body housing abutment wall 33.

According to an embodiment, said caliper body second housing 30 comprises a caliper body second housing cylindrical wall 32.

According to an embodiment, said caliper body second housing 30 comprises a caliper body second housing abutment wall.

According to an embodiment, said caliper body first housing cylindrical wall 31 has a caliper body first housing radius r1.

According to an embodiment, said caliper body first housing abutment wall 33 is a circular crown and said pin second portion 8 has a pin abutment wall 21 configured to abut against said circular-crown-shaped caliper body first housing abutment wall 33.

According to an embodiment, said pin second portion diameter D2 is either smaller than or equal to said caliper body first housing cylindrical wall diameter Dp. According to an embodiment, said elastic element outer diameter DpE is not smaller than said caliper body first housing cylindrical wall diameter Dp so that said elastic element 3 is precompressed against said caliper body first housing cylindrical wall 31 forming said axial friction constraint.

According to an embodiment, said caliper body first housing cylindrical wall 31 has a caliper body first housing cylindrical wall axial extension al along said housing axis G-G.

According to an embodiment, said caliper body first housing cylindrical wall axial extension al is not smaller than the pin first portion axial extension A1 and pin third portion axial extension A3.

The present invention further relates to a disc brake assembly for a vehicle, comprising a brake disc connected to a hub of a wheel of the vehicle, and a brake caliper 27 as previously described, in which said caliper body 28 is arranged to straddle the brake disc.

The present invention further relates to an interaction method between a pad supporting pin and an axially constraining elastic element, comprising the steps of a—providing a pin assembly as described and claimed herein, b—approaching said pin second portion 8 to said elastic 3, or vice versa, c—during step b, wedging at least partially said pin third portion profile 11 into said elastic element inner profile 13 so that said pin third portion stretch 10 biases said elastic element 3 at least in a radial direction R-R outwards with a biasing force F.

According to an embodiment, said step b provides a sub-step b1 of approaching for a first stretch said pin second portion 8 to said elastic element 3 until said elastic element 3 goes into contact with said pin third portion 9, preferably with said pin third portion stretch 10.

According to an embodiment, said step b provides a step b2 of approaching for a second stretch said pin second portion 8 to said elastic element 3 until said elastic element 3 goes into abutment with a radial wall of said pin second portion 8.

According to an embodiment, during step b2, step c provides wedging the pin third portion 9 into the elastic element 3, or wedging the pin third portion profile 11 into said elastic element inner profile 13, so that the biasing force F gradually increases as the elastic element 3 and the pin second portion 8 approach each other.

According to an embodiment, said method provides at the same time as step a, step z of providing a caliper body 28 of a brake caliper 27 as previously described, and, before said step b, said method provides step x of inserting said assembly 1 into the caliper body housings 29, 30 to position said elastic element 3, preferably by sliding, within the first caliper body housing 29 in a compressed configuration against a retaining wall of first caliper body housing, e.g., said caliper body first housing first portion cylindrical wall.

According to an embodiment, said steps b, c, b1, and b2 are performed with said elastic element 3 pre-compressed against a containing wall to form an axial constraint for said supporting pin 2.

According to an embodiment, said containing wall is a caliper body first housing wall of a first housing made in a caliper body, preferably it is a caliper body first housing cylindrical wall 31.

LIST OF REFERENCES

1 brake pad pin and axially constraining elastic element assembly
2 supporting pin
3 elastic element
4 pin body
5 head end
6 tip end
7 pin first portion
8 pin second portion
9 pin third portion
10 pin third portion stretch
11 third portion profile
12 pin stem
13 elastic element inner profile
14 elastic element outer profile
15 elastic element first radial wall
16 elastic element second radial wall
17 pin head
18 pin tip
19 pin radial first wall
20 pin radial second wall
21 pin abutment wall
22 elastic element through opening
23a, brake pad
23b brake pad
24 backing plate
25 friction material
26 plate through hole
27 brake caliper
28 caliper body
29 caliper body first housing
30 caliper body second housing
31 caliper body first housing cylindrical wall
32 caliper body second housing cylindrical wall
33 caliper body first housing circular crown abutment wall
34 caliper body elongated first element
35 caliper body elongated second element X-X pin axis
A-A axial direction
R-R radial direction
G-G caliper body housing axis
A1 pin first portion axial extension
A2 pin second portion axial extension
A3 pin third portion axial extension
A4 fourth pin portion axial extension
Ap elastic element axial extension
D1 diameter or pin first portion maximum diameter
D2 diameter or pin second portion maximum diameter
D3 pin third portion diameter
D4 diameter or pin head maximum diameter
D31 head third portion minimum diameter
D32 head third portion maximum diameter
DpI inner diameter or elastic element minimum inner diameter
DpE outer diameter or elastic element maximum outer diameter
r1 caliper body first housing cylindrical wall radius
a1 caliper body first housing cylindrical wall axial extension
Dp caliper body first housing diameter
Ds caliper body second housing diameter

The invention claimed is:

1. A brake pad pin and axially constraining elastic element assembly, comprising:

a brake pad supporting pin comprising a pin body that extends along a pin axis between a head end and a tip end, wherein said pin axis defines an axial direction, either coincident with or parallel to said pin axis, and a radial direction transverse to said axial direction, wherein said pin body comprises in succession along said axial direction towards said tip end at least one pin first portion having at least one pin first portion diameter, and a pin second portion having at least one pin second portion diameter;

and wherein said brake pad pin and axially constraining elastic element assembly comprises:

an elastic element arranged on said pin body at least at said pin first portion, wherein said elastic element has at least one elastic element inner diameter and at least one elastic element outer diameter, wherein said at least one elastic element outer diameter is either greater than or equal to said at least one pin second portion diameter, and wherein said pin body comprises a pin third portion arranged between said pin first portion and said pin second portion, wherein said pin third portion has at least one pin third portion stretch having at least one pin third portion diameter greater than said at least one elastic element inner diameter, wherein said elastic element comprises an elastic element inner profile facing towards said pin body, wherein said pin third portion comprises a pin third portion profile that connects said pin first portion and said pin second portion, wherein, when said pin third portion is biased towards said elastic element, or vice versa, said pin third portion profile is wedged at least partially into said elastic element inner profile so that said pin third portion stretch biases said elastic element at least in the radial direction outwards with a biasing force, wherein said elastic element has an elastic element longitudinal extension along said axial direction, said pin third portion has a pin third portion longitudinal extension along said axial direction, wherein said at least one elastic element inner diameter measured in at least one elastic element first section transversal to said pin axis along the elastic element longitudinal extension is either smaller than or equal to said pin third portion diameter measured in at least a first section of pin third portion transversal to said pin axis along the pin third portion longitudinal extension, and wherein said at least one elastic element inner diameter measured in at least one elastic element second section transverse to said pin axis along the elastic element longitudinal extension is either greater than or equal to said pin third portion diameter measured in at least a second section of said pin third portion transverse to said pin axis along the elastic element longitudinal extension, wherein said second section transversal to said pin axis is in an advanced position relative to said first section transversal to said pin axis in a direction of said pin second portion, and and said first section of said pin third portion transversal to said pin axis is in an advanced position in the direction of said pin second portion relative to said second section of said pin third portion transverse to said pin axis.

2. The brake pad pin and axially constraining elastic element assembly of claim 1, wherein said elastic element inner profile and said pin third portion profile are mutually shaped so that said biasing force increases when said pin second portion and said elastic element approach each other.

3. The brake pad pin and axially constraining elastic element assembly of claim 1, wherein said at least one pin second portion diameter is greater than said at least one pin first portion diameter, and wherein said at least one elastic element inner diameter is smaller than said at least one pin second portion diameter.

4. The brake pad pin and axially constraining elastic element assembly of claim 1, wherein said pin third portion profile at least at said pin third portion stretch radially increases in a direction of said pin second portion between a pin third portion minimum diameter and a pin third portion maximum diameter, and wherein said at least one elastic element inner diameter is comprised between said pin third portion minimum diameter and said pin third portion maximum diameter so that said pin third portion stretch is wedged biasing said elastic element in the radial direction.

5. The brake pad pin and axially constraining elastic element assembly of claim 4, wherein said elastic element inner profile has an elastic element constant inner diameter equal to said at least one elastic element inner diameter, or wherein said elastic element inner profile radially increases from an elastic element minimum diameter equal to said at least one elastic element inner diameter to an elastic element maximum inner diameter at least towards said pin second portion, and wherein the brake pad pin and axially constraining elastic element assembly comprises at least one of the following features:

said pin third portion profile radially increases in the direction of said pin second portion in a linear manner or a curvilinear/spoked manner;

said pin third portion profile radially increases in the direction of said pin second portion connecting said pin first portion and said pin second portion between said pin third portion minimum diameter and said pin third portion maximum diameter;

said pin third portion minimum diameter is equal to said at least one pin first portion diameter;

said pin third portion maximum diameter is either smaller than or equal to said at least one pin second portion diameter;

said pin third portion minimum diameter is either smaller than or equal to said elastic element constant inner diameter;

said pin third portion is a tapered pin portion radially increasing in the direction of said pin second portion between said pin third portion minimum diameter and said pin third portion maximum diameter with a tapering angle;

said elastic element comprises an elastic element outer profile facing outwards in the radial direction, wherein said elastic element outer profile decreases radially between an elastic element maximum outer diameter equal to said at least one elastic element outer diameter, to an elastic element minimum inner diameter at least towards said pin second portion.

6. The brake pad pin and axially constraining elastic element assembly of claim 1, wherein said pin third portion is a pin shoulder having a constant diameter equal to said pin third portion diameter, wherein said pin third portion profile connects as a step to said pin first portion and said pin second portion, wherein said elastic element inner profile increases radially between an elastic element minimum diameter equal to said at least one elastic element inner diameter and an elastic element maximum inner diameter at least towards said pin second portion with a tapering angle, wherein said pin third portion diameter is comprised between said elastic element maximum inner diameter and said elastic element minimum inner diameter, so that said pin third portion stretch is wedged biasing said elastic element in an increasing manner in the radial direction.

7. The brake pad pin and axially constraining elastic element assembly of claim 6, wherein said elastic element comprises an elastic element outer profile facing outwards in the radial direction, and wherein said elastic element outer profile has a constant diameter equal to said at least one elastic element outer diameter.

8. The brake pad pin and axially constraining elastic element assembly of claim 1, wherein said pin body comprises a pin head having a pin head diameter, wherein said pin head is connected to said pin first portion, wherein said pin head diameter is greater than said at least one elastic element inner diameter, wherein said pin head defines a pin radial first wall facing a direction of said tip end and configured to abut axially against said elastic element, and wherein said pin radial first wall extends radially between a radially inner edge having a diameter equal to said at least one pin first portion diameter and a radially outer edge having a diameter equal to said pin head diameter.

9. The brake pad pin and axially constraining elastic element assembly of claim 1, wherein said pin body comprises a pin tip connected to said pin second portion and has a tapered conformation in direction of said tip end.

10. The brake pad pin and axially constraining elastic element assembly of claim 1, wherein said pin second portion comprises at least one pin abutment wall facing towards said tip end configured to abut with a caliper body portion.

11. The brake pad pin and axially constraining elastic element assembly of claim 1, wherein said pin second portion defines a pin radial second wall facing in direction of said head end configured to abut axially said elastic element, wherein said pin radial second wall extends in the radial direction from a radially inner edge to a radially outer edge having a diameter equal to said at least one pin second portion diameter.

12. The brake pad pin and axially constraining elastic element assembly of claim 1, wherein said elastic element comprises an elastic element first radial wall configured to abut with at least one corresponding pin abutment wall, wherein said elastic element first radial wall faces towards said pin second portion, and wherein said elastic element first radial wall extends between a radially inner edge having a diameter equal to said at least one elastic element inner diameter and a radially outer edge having a diameter equal to said at least one elastic element outer diameter.

13. The brake pad pin and axially constraining elastic element assembly of claim 1, wherein said elastic member comprises an elastic element second radial wall configured to abut with at least one corresponding pin abutment wall, wherein said elastic element second radial wall faces in a direction opposite to said pin second portion, and wherein said elastic element second radial wall extends between a radially inner edge having a diameter equal to said at least one elastic element inner diameter and a radially outer edge having a diameter equal to said at least one elastic element outer diameter.

14. The brake pad pin and axially constraining elastic element assembly of claim 1, wherein said elastic element has annular and/or tubular shape.

15. The brake pad pin and axially constraining elastic element assembly of claim 1, wherein said elastic element comprises an elastic element through opening parallel to said axial direction.

16. The brake pad pin and axially constraining elastic element assembly of claim 1, wherein a pin third portion axial extension is at least ⅙ of an elastic element axial extension.

17. A brake caliper comprising at least one caliper body and at least one brake pad pin and axially constraining elastic element assembly comprising:

a brake pad supporting pin comprising a pin body that extends along a pin axis between a head end and a tip end, wherein said pin axis defines an axial direction, either coincident with or parallel to said pin axis, and a radial direction transverse to said axial direction, wherein said pin body comprises in succession along said axial direction towards said tip end at least one pin first portion having at least one pin first portion diameter, and a pin second portion having at least one pin second portion diameter;

and wherein said brake pad pin and axially constraining elastic element assembly comprises:

an elastic element arranged on said pin body at least at said pin first portion, wherein said elastic element has at least one elastic element inner diameter and at least one elastic element outer diameter, wherein said at least one elastic element outer diameter is either greater than or equal to said at least one pin second portion diameter, and wherein said pin body comprises a pin third portion arranged between said pin first portion and said pin second portion, wherein said pin third portion has at least one pin third portion stretch having at least one pin third portion diameter greater than said at least one elastic element inner diameter, wherein said elastic element comprises an elastic element inner profile facing towards said pin body, wherein said pin third portion comprises a pin third portion profile that connects said pin first portion and said pin second portion, wherein, when said pin third portion is biased towards said elastic element, or vice versa, said pin third portion profile is wedged at least partially into said elastic element inner profile so that said pin third portion stretch biases said elastic element at least in the radial direction outwards with a biasing force, wherein said elastic element has an elastic element longitudinal extension along said axial direction, said pin third portion has a pin third portion longitudinal extension along said axial direction, wherein said at least one elastic element inner diameter measured in at least one elastic element first section transversal to said pin axis along the elastic element longitudinal extension is either smaller than or equal to said pin third portion diameter measured in at least a first section of pin third portion transversal to said pin axis along the pin third portion longitudinal extension, and wherein said at least one elastic element inner diameter measured in at least one elastic element second section transverse to said pin axis along the elastic element longitudinal extension is either greater than or equal to said pin third portion diameter measured in at least a second section of said pin third portion transverse to said pin axis along the elastic element longitudinal extension, wherein said second section transversal to said pin axis is in an advanced position relative to said first section transversal to said pin axis in a direction of said pin second portion, and and said first section of said pin third portion transversal to said pin axis is in an advanced position in the direction of said pin second portion relative to said second section of said pin third portion transverse to said pin axis;

wherein said caliper body comprises a first elongated element and a second elongated element, wherein said first elongated element comprises at least one caliper body first housing and said second elongated element comprises at least one caliper body second housing, wherein said caliper body first housing and said caliper body second housing each have a housing axis parallel to and coincident with said pin axis, wherein said caliper body first housing comprises at least one first housing first portion, said caliper body first housing having prevalent longitudinal extension and having a caliper body first housing diameter, and said caliper body second housing having prevalent longitudinal extension and having a caliper body second housing diameter, wherein said pin second portion is at least partially housed in said caliper body first housing and said pin first portion is housed with clearance in said caliper body first housing, wherein said elastic element is housed in said first housing first portion, and wherein said at least one elastic element outer diameter is either greater than or equal to said first housing diameter to make an axial constraint opposing an extraction in the axial direction of said brake pad supporting pin from the caliper body.

18. An interaction method between a pad supporting pin and an elastic retaining element, the interaction method comprising:

a) providing a brake pad pin and axially constraining elastic element assembly, comprising:

a brake pad supporting pin comprising a pin body that extends along a pin axis between a head end and a tip end, wherein said pin axis defines an axial direction, either coincident with or parallel to said pin axis, and a radial direction transverse to said axial direction, wherein said pin body comprises in succession along said axial direction towards said tip end at least one pin first portion having at least one pin first portion diameter, and a pin second portion having at least one pin second portion diameter;

and wherein said brake pad pin and axially constraining elastic element assembly comprises:

an elastic element arranged on said pin body at least at said pin first portion, wherein said elastic element has at least one elastic element inner diameter and at least one elastic element outer diameter, wherein said at least one elastic element outer diameter is either greater than or equal to said at least one pin second portion diameter, and wherein said pin body comprises a pin third portion arranged between said pin first portion and said pin second portion, wherein said pin third portion has at least one pin third portion stretch having at least one pin third portion diameter greater than said at least one elastic element inner diameter, wherein said elastic element comprises an elastic element inner profile facing towards said pin body, wherein said pin third portion comprises a pin third portion profile that connects said pin first portion and said pin second portion, wherein, when said pin third portion is biased towards said elastic element, or vice versa, said pin third portion profile is wedged at least partially into said elastic element inner profile so that said pin third portion stretch biases said elastic element at least in the radial direction outwards with a biasing force, wherein said elastic element has an elastic element longitudinal extension along said axial direction, said pin third portion has a pin third portion longitudinal extension along said axial direction, wherein said at least one elastic element inner diameter measured in at least one elastic element first section transversal to said pin axis along the elastic element longitudinal extension is either smaller than or equal to said pin third portion diameter measured in at least a first section of pin third portion transversal to said pin axis along the pin third portion longitudinal extension, and wherein said at least one elastic element inner diameter measured in at least one elastic element second section transverse to said pin axis along the elastic element longitudinal extension is either greater than or equal to said pin third portion diameter measured in at least a second section of said pin third portion transverse to said pin axis along the elastic element longitudinal extension, wherein said second section transversal to said pin axis is in an advanced position relative to said first section transversal to said pin axis in a direction of said pin second portion, and and said first section of said pin third portion transversal to said pin axis is in an advanced position in the direction of said pin second portion relative to said second section of said pin third portion transverse to said pin axis, b) approaching said pin second portion to said elastic element, or vice versa, and c) during step b), wedging at least partially said pin third portion profile into said elastic element inner profile so that said pin third portion stretch biases said elastic element at least in the radial direction outwards with a biasing force.

\* \* \* \* \*